United States Patent [19]

Powell

[11] Patent Number: 4,758,981

[45] Date of Patent: Jul. 19, 1988

[54] SIGNAL SORTING ELEMENT WITH INTERNAL SIGNAL ADDRESS VALUE SORTING CRITERION

[75] Inventor: Jon N. Powell, Lewisville, Tex.

[73] Assignee: SGS-Thomson Microelectronics, Inc., Carrollton, Tex.

[21] Appl. No.: 686,180

[22] Filed: Dec. 24, 1984

[51] Int. Cl.$^4$ ............................................... G06F 7/08
[52] U.S. Cl. ..................................................... 364/900
[58] Field of Search ... 364/200 MS File, 900 MS File; 340/146.2

[56] References Cited

U.S. PATENT DOCUMENTS

| | | | |
|---|---|---|---|
| 3,514,760 | 5/1970 | Kautz | 364/900 |
| 4,410,960 | 10/1983 | Kasuya | 340/146.2 |
| 4,584,664 | 4/1986 | Burrows | 364/900 |

Primary Examiner—Raulfe B. Zache
Assistant Examiner—Emily Y. Chan
Attorney, Agent, or Firm—Roland Plottel

[57] ABSTRACT

A circuit element incorporating a logic circuit and a constant address number signal source which serves to distinguish one circuit element from others that are otherwise similar, has two inputs (A) and (B), a low output (L) and a high output (H). This element utilizes the address portions of respective digital signal bytes provided respectively to its two outputs, to determine whether the A input will go to the low output and the B input to the high output or vice versa. The element includes, in addition to the address source, a detector for null address portions at each output and a switch responsive to the null detector for substituting the internally stored address number for the input address when a null address portion is detected. The logic circuit also includes an equality detector, for comparing the outputs of the respective switches, which cooperates with the null detector for the A input and an AND-gate to produce a control signal when the switch outputs are equal and the null detector for the A input detects a null address portion. Another comparator produces a control signal when the output of the switch controlled by the A input is greater than the output of the other switch. An OR-gate permit a control signal from either of the sources just described to be operative for connecting the A input to the high input and the B input to the low output.

6 Claims, 1 Drawing Sheet

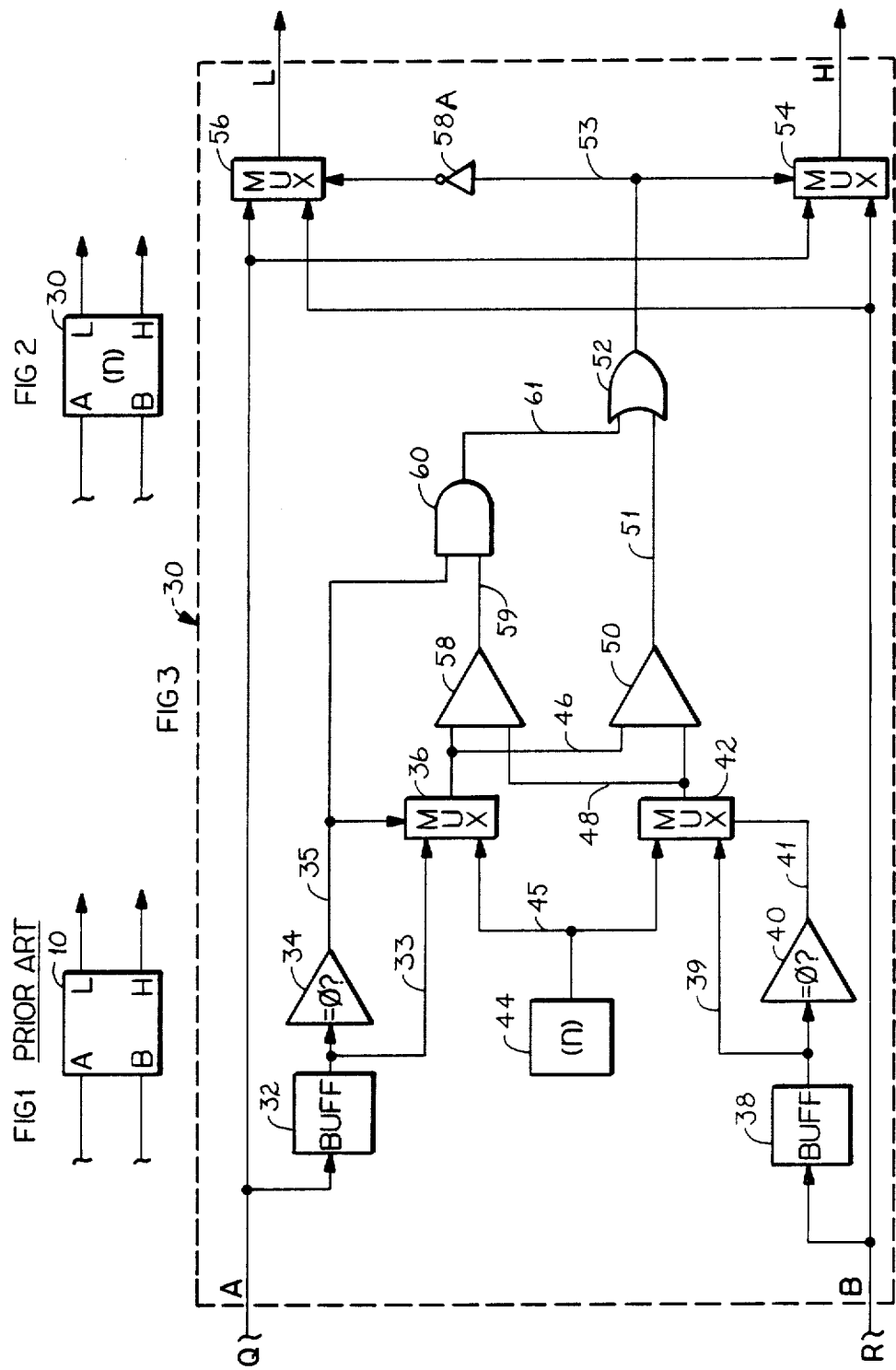

1

SIGNAL SORTING ELEMENT WITH INTERNAL SIGNAL ADDRESS VALUE SORTING CRITERION

CROSS REFERENCE TO RELATED APPLICATIONS

Cross reference is made herein to copending commonly-owned U.S. patent application Ser. No. 686,314 filed 12/24/84, now U.S. Pat. No. 4,685,128, entitled ROUTING TECHNIQUE.

TECHNICAL FIELD OF THE INVENTION

The invention relates to a circuit element for sorting signals, based on a characteristic of each signal.

BACKGROUND OF THE INVENTION

Prior art "bubble-sort" elements are known that compare the magnitudes of two input signals and throughput the signal of lesser magnitude to a "low" output and throughput the signal of greater magnitude to a "high" output. When there is only one input signal, it is throughput to the "high" output since it is of greater magnitude than the other input, which is null. Thus, the output to which a particular signal is throughput may be affected by the presence of another input.

SUMMARY OF THE INVENTION

It is an object of this invention to provide a modified "bubble-sort" element that throughputs an input signal to a specific output based solely on the magnitude of the signal independent of other inputs.

According to the invention a sort element has two inputs (A, B), a low (L) and a high (H) output, and an address (n) associated therewith. Characteristic values of signals on the inputs (A, B) are compared with each other so that the signal having the lower value is throughput to the (L) output and the signal having the higher value is throughput to the (H) output. If there is only one input signal, it is compared with the element address (n). If its characteristic value is less than or equal to the address (n), it is throughput to the (H) output.

Other objects, features and advantages of the invention will become apparent in light of the following description thereof.

BRIEF DESCRIPTION OF THE DRAWINGS

FIG. 1 is a block diagram of a prior art sort element;
FIG. 2 is a block diagram of the sort element of this invention; and
FIG. 3 is a schematic detailing the sort element of this invention.

DESCRIPTION OF THE PREFERRED EMBODIMENTS

FIG. 1 discloses a prior art bubble sort element 10 that compares the magnitude of signals impressed upon two inputs (A) and (B), and throughputs the signal of lesser magnitude to a "low" output (L) and the signal of the greater magnitude to a "high" output (H). In the context of digital signals, the addresses of address-bearing data are compared by the element 10. The data bearing the lesser address is throughput to the "low" output (L), and the data bearing the greater address is throughput to the "high" output (H). In the case of only one input signal, the other input is null (N), and the input signal will be throughput to the "high" output (H) since it is ipso facto of greater magnitude.

In FIG. 2 is shown a modified bubble sort element 30 of the present invention that has an address (n) associated therewith. When address-bearing data (bytes) are presented to the inputs (A) and (B) of the element 30, the addresses of the bytes are compared, and the byte having the lesser address is throughput to a "low" output (L) and the byte having the greater address is throughput to a "high" output (H). In the case of only one input signal, the other input is considered null (N) and the comparison is made between the address of the byte and the element address (n). The byte is throughput to the "low" output (L) if its address is less than or equal to (n), or to the "high" output (H) if its address is greater than (n). The null input (N) is throughput to the other output. In the case of two null inputs (N), the outputs (L, H) are null. The address (n) is thus a built-in sorting criterion.

FIG. 3 discloses a circuit for the element 30. A byte (Q), having address and data bits, is presented to the input (A). A similarly-sized byte (R) is presented to the input (B). A buffer 32 isolates the address of the byte (Q) and presents it on a line 33 to a value comparator 34 where it is compared to ZERO to test for a null input (N) on the input (A), in which case a logic ONE is provided on a line 35 to a multiplex switch 36. Similarly, a buffer 38 isolates the address of the byte (R) and presents it on a line 39 to a value comparator 40 where it is compared to ZERO to test for a null input (N) on the input (B), in which case a logic ONE is provided on a line 41 to a multiplex switch 42. It would be equivalent to locate the buffers 32, 38 in the lines 33, 39 respectively, so that the entire bytes were compared ZERO for non input detection.

An address means, such as a constant generator 44 provides an address (n) on a line 45 to one input of each multiplexer 36, 42. The address means may also be hard wired, a dip-switch, or a ROM.

In response to the output of the comparator 34, the multiplexer 36 throughputs the address of the byte (Q) or, in the case of a null input (N) on the input (A), throughputs the stored address (n) to a line 46. Similarly, in response to the output of the comparator 40 the multiplexer 42 throughputs the address of the byte (R) or, in the case of a null input (N) on the input (B), throughputs the stored address (n) to a line 48. A comparator 50 is responsive to the throughputs of the multiplexers 36, 42 and provides a logic ONE on a line 51 to an OR gate 52 if the address on the line 46 is greater than the address on the line 48. The output of the OR gate 52 on a line 53 controls two multiplex switches 54 and 56, the latter via an inverter 58A. These switches 54, 56 are operable to throughput the signals on the inputs (A) and (B) to the outputs (L) and (H) based on the output of the comparator 50. Therefore, if the address of the byte (Q) is less than the address of the byte (R); (A) is less than (B), the output of the comparator 50 is ZERO, the switch 56 throughputs the byte (Q) to the (L) output, and the switch 58 throughputs the byte (R) to the (H) output. For the case of (Q) greater than (R); (A) is greater than (B), the comparator 50 output is ONE, (R) or (N) is throughput by the switch 56 to (L), and (Q) is throughput by the switch 58 to (H).

In the case of a null input (N) on (A); if the address of the byte (R) on (B) is less than the internal address (n) the output of the comparator 50 is ONE so that (R) is throughput to the (L) output, and if the address of the byte (R) is greater than (n) the comparator 50 output is ZERO so that (R) is throughput to (H). In the case of a null input (N) on (B); if the address of the byte (Q) is less than or equal to the internal address (n) the comparator 50 output is ZERO so that (Q) is throughput to (L), and if the address of (Q) is greater than (n) the comparator 50 output is ONE and (Q) is throughput to (H). A comparator 58 is also responsive to throughputs of the multiplexers 36, 42 and provides a logic ONE on a line 59 to an AND gate 60 is the address on the line 46 equals the address on the line 48. This can happen if both bytes (Q) and (R) have the same address, if both inputs (A) and (B) are null (N), or if one input is null and the address of the byte on the other input equals (n). If the input (A) is also null (N), a logic ONE is provided by the comparator 34 on the line 35 to the AND gate 60 so that a logic ONE is provided on a line 61 to the OR gate 52. This "overrides" the output of the comparator 50 for the case of two null inputs, so that (B=N) is throughput to (L) and (A=N) is throughput to (H). For the case of a null input (N) on (A) and the address of the byte (R) equalling the internal address (n), (R) is throughput to (L). A truth table for the combinations of inputs and outputs is contained in the following TABLE.

TABLE

| CASE | 61 | 51 | L | H |
|---|---|---|---|---|
| A < B | 0 | 0 | A | B |
| A > B | 0 | 1 | B | A |
| A = B | 0 | 0 | A | B |
| A = B = N | 1 | 0 | B | A |
| A < n, B = N | 0 | 0 | A | B |
| A > n, B = N | 0 | 1 | B | A |
| A = n, B = N | 0 | 0 | A | B |
| B < n, A = N | 0 | 1 | B | A |
| B > n, A = N | 0 | 0 | A | B |
| B = n, A = N | 1 | 0 | B | A | n = address of element
A, B = inputs to element
L = "low" output of element
H = "high" output of element
N = null input The circuit of this invention is especially well suited to VLSI or wafer scale implementation. It is useful as a routing element in a routing network such as described in the above-referenced related and commonly owned patent application.

It should be understood that various changes could be made to the invention without departing from the spirit and scope thereof. For instance, the positive logic disclosed herein could be replaced by negative logic. Or, one input signal that eqauls (n) could be routed to the (H) output, rather than the (L) output.

What is claimed is:

1. A circuit element comprising first and second inputs (A, B), a low output (L) and a high output (H) and further comprising:

two-position signal switch-through means having a first position in which said first input (A) of said circuit element is connected to said high output (H) thereof and said second input (B) of said circuit element is connected to said low output (L) thereof and having a second position in which said first input (A) of said circuit element is connected to said low output (L) thereof and said second input (B) of said circuit element is connected to said high output (H) thereof;

means for producing within said circuit element a predetermined constant signal value (n) assigned to said circuit element to identify said circuit element and to distinguish it from otherwise similar circuit elements;

comparison means for comparing values of address signal portions of respective signals appearing, at the same time, at said first and second inputs and for comparing said address signal portions of each of said respective signals at said inputs with said predetermined constant signal value (n);

first and second null detection means for respectively detecting null values of said address signal portions at said first and second inputs;

means, interconnected with and responsive to said comparison means, said first and second null detection means and said constant signal value producing means for producing a control signal in a first state thereof and applying said control signal in said first state thereof to said switch-through means and thereby putting said switch-through means in said second position thereof (a) when neither of said null detectors is detecting a null signal value and said address signal portion value at said second input (B) of said element is found by said comparison means to exceed said address signal portion value at said first input (A) of said element, (b) when said second null detector is detecting a null signal value at said second input (B) of said element and said comparison means determines that said address signal portion value at said first input (A) of said element does not exceed said predetermined constant signal value and (c) when said first null detector is detecting a null signal value at said first input (A) of said element and said comparison means determines that said address signal portion value at said second input (B) of said element exceeds said predetermined constant signal value, and in all other cases producing said control signal in a second state thereof and applying said control signal in said second state thereof to said signal switch-through means and thereby putting said signal switch-through means into said first position thereof.

2. A circuit element according to claim 1 for dealing with digital signals in the form of bytes of binary digit signals, wherein the said address signal portion is an address portion of a said byte, said address signal portion value is the numerical value of said address portion of said byte and said predetermined constant signal value (n) is a numerical value.

3. A circuit element for routing signals between inputs and outputs thereof, in accordance with values of address portions of signals respectively appearing at the same time on said inputs, in a routing network of similar circuit elements and having first and second inputs (A,B), a low output (L) and a high output (H) and further comprising:

element address means (44) for providing an element address signal (45) having a predetermined constant value (n), for distinguishing said element from otherwise similar elements in a portion of said routing network;

a first comparator (34) having an input connected to said first input (A), containing means for comparing a signal at said first input with a constant reference null signal and having an output for providing a binary first signal (35) in a first state indicative of the presence of a null signal (N) at said first input (A) or in a second state when a signal other than a null signal is present at said first input (A);

a second comparator (40) for providing a binary second signal (41) in a first state indicative of the presence of a null signal (N) at said second input (B) or or in a second state when a signal other than a null signal is present at said second input (B);

first switch means (36), having input terminals connected to said first input (A) and to said element address means (44), having an output terminal and controlled by said binary first signal (35) so as to provide at said output terminal a binary third signal (46) which has the value of said element address signal (n) when said binary first signal (35) provided at the output of said first comparator is in its first state and which has the value of the address portion of the signal on the first input (A) when said binary first signal (35) provided at the output of said first comparator is in its second state;

second switch means (42), having input terminals connected to said second input (B) and to said element address means (44), having an output terminal and controlled by said binary second signal (41) so as to provide at said output terminal a binary fourth signal (48) which has the value of said element address signal (n) when said binary second signal (41) provided at the output of said second comparator is in its first state and which has the value of the address portion of the signal on said second input (B) when said binary second signal (41) provided at the output of said second comparator is in its second state;

third comparator means (50) having inputs connected respectively to the output terminals of said first and second switch means and having an output for providing a binary fifth signal (51) in a first state thereof when the value of said binary third signal (46) is greater than the value of said binary fourth signal (48) or in a second state in all other cases;

logic means (52, 58, 60) having inputs respectively connected for receiving said binary third, fourth and fifth signals and an output for providing a first state of a binary sixth signal (53) when said binary fifth signal (51) is in its first state and for also providing said first state of said binary sixth signal (53) when said binary first signal (35) is in its first state and at the same time the value of said binary fourth signal (48) equals the value of said binary third signal (46) and for providing a second state of said binary sixth signal (53) in all other cases;

third switch means (54, 56) for providing the signal on the first input (A) to the low output (L) and the signal on the second input (B) to the high output (H) in response to the provision, by said logic means, of said second state of said binary sixth signal (53), and for providing the signal on the first input (A) to the "high" output (H) and the signal on the second input (B) to the "low" output (L) in response to the provision by said logic means of said first state of said binary sixth signal (53).

4. A circuit element according to claim 3 for dealing with digital signals in the form of bytes of binary digit signals, each said byte having an address portion wherein said signal address portion for each said byte is the address portion of the byte, and said element address means, comparators, switch means and logic means are all constituted according to digital electronics technology.

5. A circuit element for routing signals respectively having address signal portions, comprising first and second inputs (A, B), a low output (L) and a high output (H) and further comprising:

means (44) for producing within said circuit a predetermined constant signal value (n) assigned to said circuit element to identify said circuit element and to distinguish it from otherwise similar circuit elements;

first (34) and second (35) null detection means for respectively detecting null values of said address signal portions at said first and second inputs;

first (36) and second (42) program switches respectively controlled by said first (34) and second (35) null detection means, respectively having outputs, having first inputs respectively connected to said inputs (A, B) of said element and both having second inputs connected to said constant signal value producing means, with control by a said null detection means always selecting the second input of a program switch for connection to the program switch output when a null value is detected by the corresponding null detection means;

first (58) and second (50) comparison means, each having an output and two inputs respectively connected to said outputs of said first and second switches, for comparing the values of signal address portions appearing contemporaneously at the respective outputs of said first (36) and second (42) program switches, said first comparison means providing a first decision signal when said respective values of signal address portions are equal and said second comparison means being constituted to furnish a second decision signal when the output of said first program switch is greater than the output of said second program switch in signal address portion value;

logic circuit means (60, 52), connected to the outputs of said first (58) and second (50) comparison means and the output of said first null detection means (34) for producing a control signal in a first state thereof (a) when said second comparison means produces said second decision signal or (b) when said first comparison means produces said first decision signal and at the same time said first null detection means (34) produces an address portion null detection signal, and for producing said control signal in a second state thereof in all other cases, and signal switch-through means responsive to said control signal for connecting said first input (A) of said element to said low output (L) thereof and said second input (B) of said element to said high output (H) thereof when said control signal is in said second state thereof and for connecting said first input (A) of said element to said high output (H) thereof and said second input (B) of said element to said low output (L) thereof when said control signal is in said first state thereof.

6. A circuit element according to claim 5 for dealing with digital signals in the form of bytes of binary digit signals, wherein the said address signal portion is an address portion of a said byte, said address signal portion value is the numerical value of said address portion of said byte and said predetermined constant signal value (n) is a numerical value.

* * * * *